(12) United States Patent
Dobric

(10) Patent No.: US 10,490,901 B2
(45) Date of Patent: Nov. 26, 2019

(54) VIVALDI ANTENNA-BASED ANTENNA SYSTEM

(71) Applicant: AKG Acoustics GmbH, Vienna (AT)

(72) Inventor: Nikola Dobric, Vienna (AT)

(73) Assignee: AKG Acoustics GmbH, Vienna (AT)

( * ) Notice: Subject to any disclaimer, the term of this patent is extended or adjusted under 35 U.S.C. 154(b) by 0 days.

(21) Appl. No.: 15/909,355

(22) Filed: Mar. 1, 2018

(65) Prior Publication Data

US 2018/0254562 A1    Sep. 6, 2018

(30) Foreign Application Priority Data

Mar. 1, 2017    (EP) ..................................... 17158666

(51) Int. Cl.
| | | |
|---|---|---|
| *H01Q 13/10* | (2006.01) | |
| *H01Q 13/08* | (2006.01) | |
| *H01Q 1/08* | (2006.01) | |
| *H01Q 23/00* | (2006.01) | |
| *H04B 1/18* | (2006.01) | |
| *H01Q 19/30* | (2006.01) | |
| *H01Q 21/20* | (2006.01) | |
| *H01Q 15/14* | (2006.01) | |
| *H01Q 13/16* | (2006.01) | |
| *H01Q 3/44* | (2006.01) | |
| *H01Q 7/00* | (2006.01) | |
| *H01Q 13/18* | (2006.01) | |
| *H01Q 21/06* | (2006.01) | |

(Continued)

(52) U.S. Cl.
CPC ........... *H01Q 13/085* (2013.01); *H01Q 1/088* (2013.01); *H01Q 19/30* (2013.01); *H01Q 21/205* (2013.01); *H01Q 23/00* (2013.01); *H04B 1/18* (2013.01); *H01Q 3/443* (2013.01); *H01Q 7/00* (2013.01); *H01Q 9/285* (2013.01); *H01Q 13/10* (2013.01); *H01Q 13/16* (2013.01); *H01Q 13/18* (2013.01); *H01Q 21/005* (2013.01); *H01Q 21/0043* (2013.01); *H01Q 21/0062* (2013.01); *H01Q 21/064* (2013.01)

(58) Field of Classification Search
CPC ........ H01Q 13/16; H01Q 13/10; H01Q 3/443; H01Q 7/00; H01Q 13/18; H01Q 21/064; H01Q 21/0043; H01Q 21/005; H01Q 21/0062; H01Q 1/2275
USPC ........ 343/746, 747, 767–771, 904, 906, 916
See application file for complete search history.

(56) References Cited

U.S. PATENT DOCUMENTS

| | | | |
|---|---|---|---|
| 8,654,031 B2 * | 2/2014 | Livingston | ............. H01Q 1/088 343/700 MS |
| 2003/0169205 A1 | 9/2003 | Gioia et al. | |

(Continued)

*Primary Examiner* — Binh B Tran
(74) *Attorney, Agent, or Firm* — Brooks Kushman P.C.

(57) ABSTRACT

The invention relates to an antenna system for electromagnetic waves in a microwave range. At least one directional antenna such as a Vivaldi antenna and/or an omnidirectional antenna such as a dipole antenna, with at least one central unit including at least one active member which is connectible with at least one reception/transmission system is disclosed. To make the system more flexible, the plugged-in antenna is capacitively coupled to at least one motherboard of the central unit and a booster module, an attenuation module, a calibration module, a combiner module, a filter module, or a passive module is optionally pluggable in the central unit to provide a pluggable module. The functionality of the central unit is determined based on the plugged-in module.

15 Claims, 4 Drawing Sheets

(51) Int. Cl.
*H01Q 21/00* (2006.01)
*H01Q 9/28* (2006.01)

(56) References Cited

U.S. PATENT DOCUMENTS

| | | |
|---|---|---|
| 2007/0025567 A1 | 2/2007 | Fehr |
| 2009/0121947 A1* | 5/2009 | Nysen ............ H01Q 1/2275 343/702 |
| 2011/0074640 A1 | 3/2011 | Wakabayashi |
| 2012/0306715 A1 | 12/2012 | Montgomery et al. |
| 2016/0126981 A1 | 5/2016 | Koch et al. |
| 2016/0254870 A1* | 9/2016 | O'Keeffe ............ H01Q 21/24 455/67.14 |

* cited by examiner

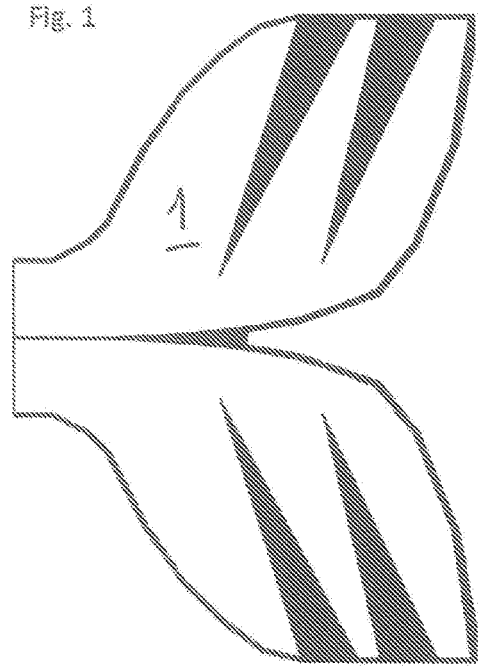
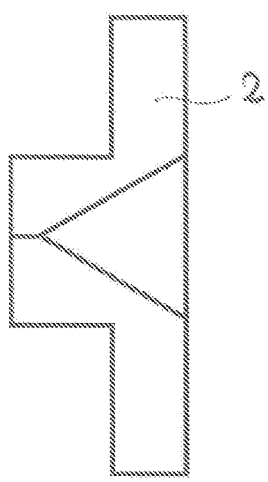
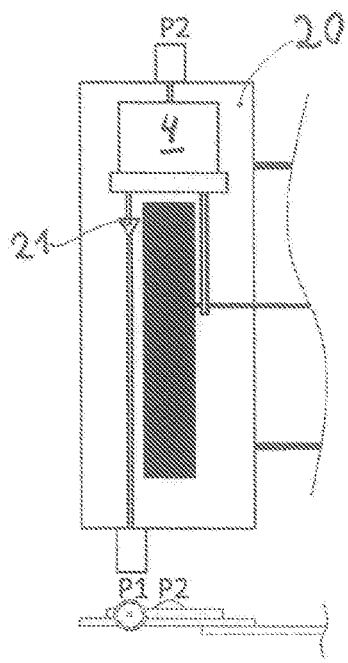
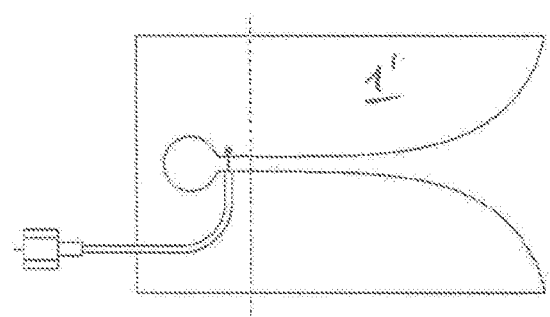

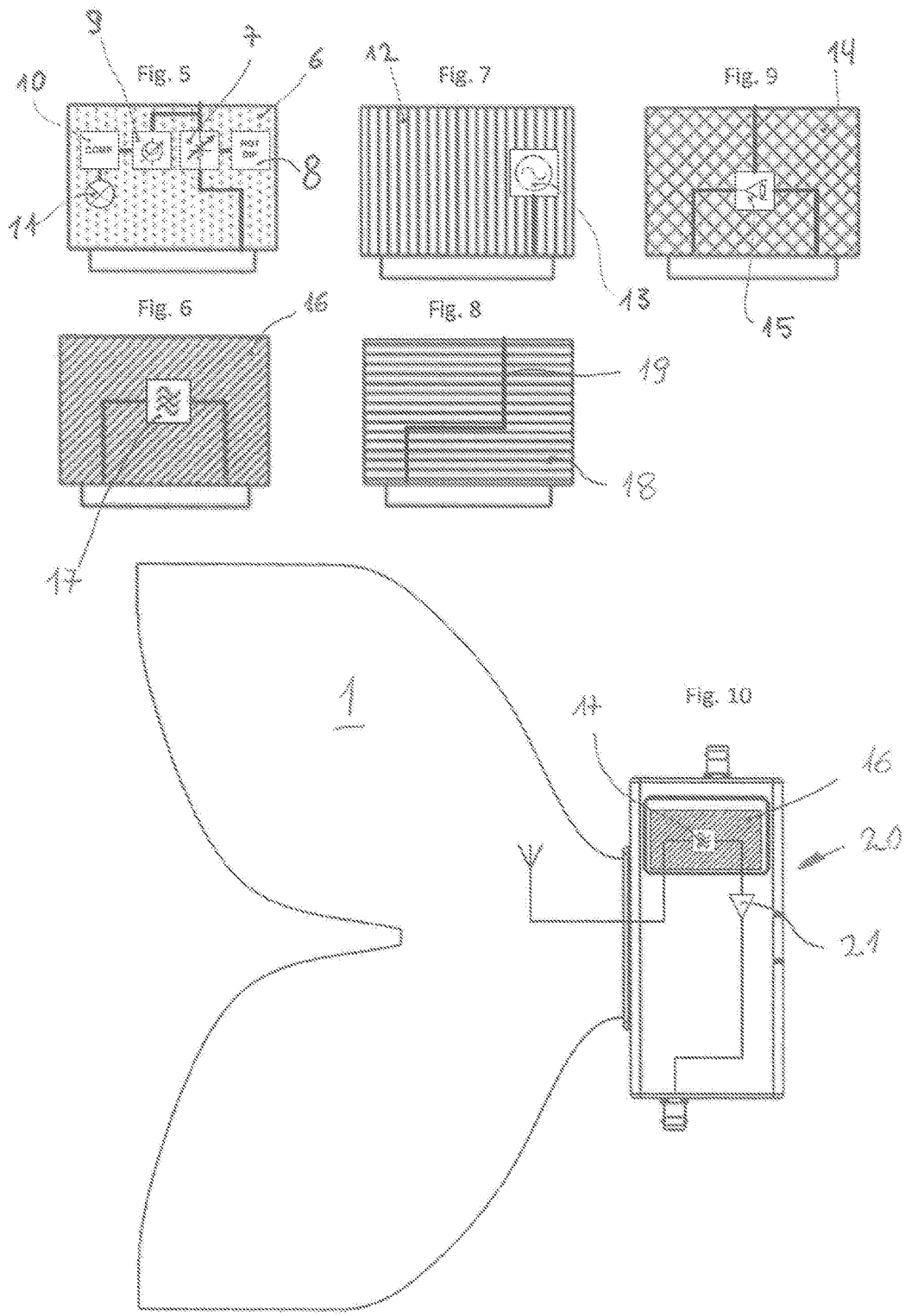

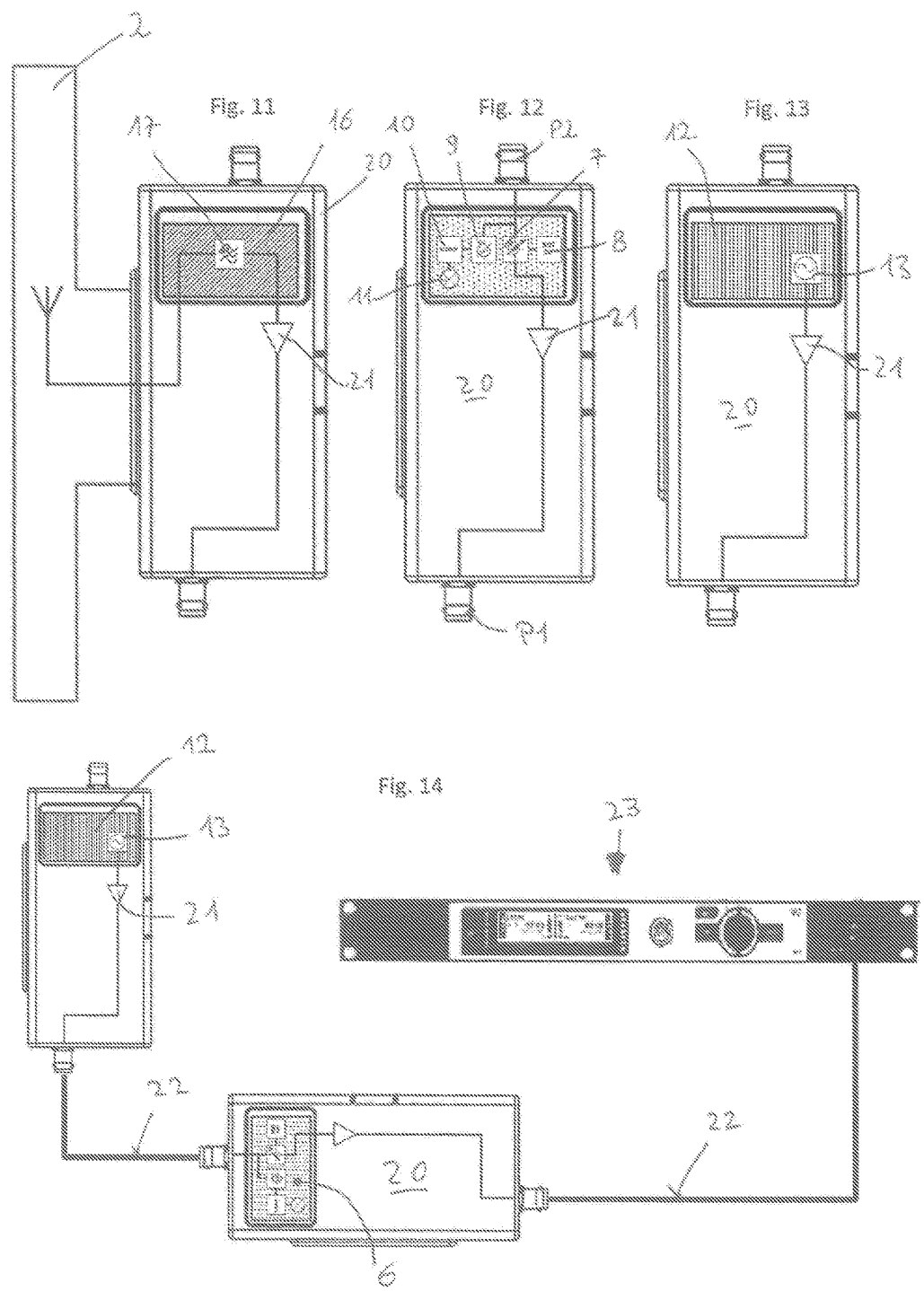

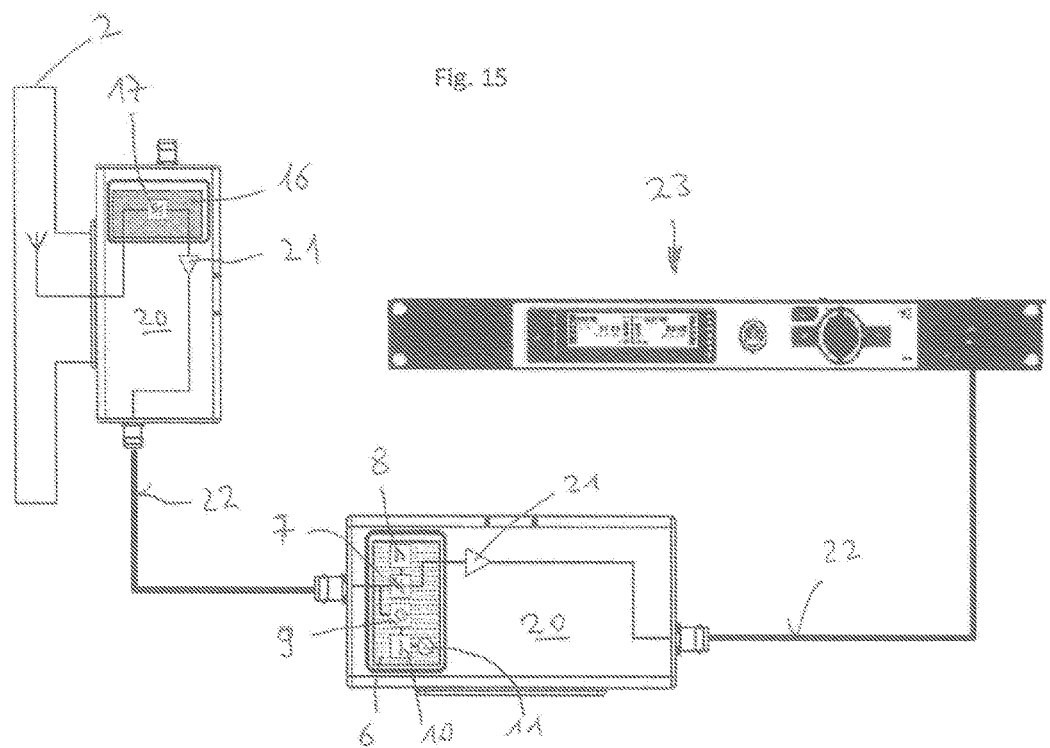
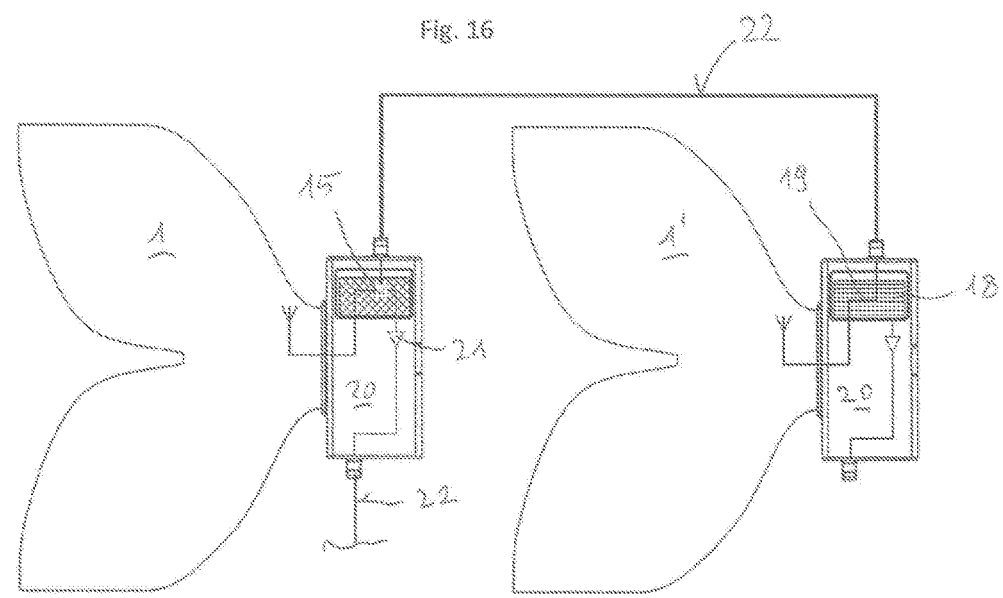

VIVALDI ANTENNA-BASED ANTENNA SYSTEM

CROSS-REFERENCE TO RELATED APPLICATIONS

This application claims foreign priority benefits under 35 U.S.C. § 119(a)-(d) to EP Application Serial No. 17158666.2 filed Mar. 1, 2017, the disclosure of which is hereby incorporated in its entirety by reference herein.

TECHNICAL FIELD

The invention relates to an antenna system for electromagnetic waves in the microwave range, preferably with a Vivaldi antenna, in accordance to the claim.

BACKGROUND

Vivaldi antennas for the microwave range are known in the prior art, and each antenna of this type has radiating members or short members, which are made of conducting plates, so that a plurality of such members can be arranged in different planes, which makes it optionally possible to connect them directly to a coaxial cable.

In a number of the present-time applications, especially in receiving signals originating from wireless microphones, which are used in an environment that is not built for the purpose, more specifically, in theatrical performances, concerts and the like, it is necessary to have different antennas or antenna combinations available—as many as needed, resulting in the need to have a larger number of such antennas available compared to what would be actually required in order to be able to make an appropriate choice. The associated costs, both in the form of the investments and the maintenance, transportation, and storage cost, are quite considerable, and there are still causes for disturbances or defects, which result in a fault of the entire system no matter in which part of the receiving system they emerge.

SUMMARY

The invention is based on the problem of providing a solution that allows the above disadvantages to be eliminated or at least greatly reduced.

According to the invention, this solution is based on features recited in the claim, such as, on providing a modular construction of a receiving system, having a central unit or a base, which is the only component part of an active electronic component, in which different Vivaldi antennas and antenna members, in general, as will be described below, and claimed can be optionally plugged, whereby, depending on a specific application, an antenna member with directional or omnidirectional antenna pattern can be used and various filtering modules, booster modules, calibration modules, and combiner members can be optionally plugged in the central unit in other geometrical areas.

This makes is possible to reduce the number of expensive central units to a predetermined minimum and to have only a small number of backup units just in case. It is possible to stock up, as required, the antenna members which are very inexpensive compared to the previously required entire device without any difficulties associated with their cost, required space or arrangement, which also applies to appropriate boosters, filters, calibration or combiner modules, which are inexpensive passive components that do not require much space (the active components are provided only in the central unit with the amplifier module).

It is thereby possible to configure an appropriate combination on site, and it is easy to make necessary adjustments to the receiving devices according to changes in conditions.

BRIEF DESCRIPTION OF THE DRAWINGS

The invention will be described below as applied to its embodiments with reference to the accompanying schematic drawings, in which, FIG. 1 shows a Vivaldi antenna member for use with a central unit, FIG. 2 shows a slot dipole antenna member for use with a central unit, FIG. 3 shows a central unit, FIG. 4 shows a conventional design of Vivaldi antenna, FIGS. 5 through 9 show different modules to be combined with the central unit, FIG. 10 shows an active directional antenna composed of a central member, a Vivaldi antenna member, and a filter module, FIG. 11 shows an active directional antenna composed of a central unit, a slot dipole antenna member, and a filter module, FIG. 12 shows a booster composed of a central unit and a booster module, FIG. 13 shows a calibration unit composed of a central unit and a calibration module, FIG. 14 shows a system arrangement composed of a calibration unit, a booster, and a receiver, FIG. 15 shows a system arrangement composed of an active antenna, a booster, and a receiver; and FIG. 16 shows a combination of two Vivaldi antennas.

DETAILED DESCRIPTION

It is not necessary to provide more detailed explanations of the design and use of different antennas for those skilled in the art of Vivaldi antennas to understand the invention, and the use of interchangeable filter modules is also well known to those skilled in the art for understanding the invention. This interchangeability allows for responding to different transmission paths and to their specifics so as to adjust properly the overall characteristics of the entire system.

FIG. 1 shows, purely schematically, the radiating part of a directional Vivaldi antenna 1. FIG. 2, also purely schematically, shows the radiating part of a slot dipole antenna 2 with an omnidirectional pattern. FIG. 3, also purely schematically, shows an arrangement of a central unit 20 having a motherboard 3 and a shown antenna, which may be either the Vivaldi antenna 1 or the slot dipole antenna 2. The antenna is capacitively coupled to the motherboard 3. Reference number 4 indicates (any) plugged-in module shown, with P1, P2 as the input and output ports of the central unit 20. In the active antenna function, only port P1 is active and port P2 does not have a function. Port P2 functions as the input and port P1 function as the output only in the booster function (intermediate amplifier). A coaxial signal cable optionally connects to ports P1, P2 depending on application; shown at 21 is an amplifier, which is an active component of the central unit 20.

FIG. 4 shows, purely schematically, a state-of-the-art Vivaldi antenna 1', which is intended to illustrate the principle of the modular design, because, according to the invention and unlike in the prior art, the radiating part is separated from the non-radiating part and can be connected through a capacitive coupling, which allows for advantageously changing antennas according to the invention.

Further, it is also possible to use interchangeable modules with a module adapter 4 in order to change other properties, for example, selectivity, in addition to the antenna directional pattern.

Furthermore, the Vivaldi antenna 1, which is preferably constructed using the circuit-board technology, has at least two, ideally four, recesses 1' in the bonding, which advantageously improve the antenna gain at lower frequencies because the return current produces additional fields at the edges of the recess, which interact with the main field, thereby improving the directional pattern in the main beam direction. The recess can be approximately regarded as reflectors or directors. Furthermore, the Vivaldi antenna 1 can thus be made more compact.

The slot dipole antenna 2, preferably constructed using the printed-circuit technology, has at least one triangular member 2' in the bonding, which divides the antenna slot into at least two separate slots 2", whereby the bandwidth is advantageously improved. With bandwidth, a lower return current damping (S11<−10 dB) obtains over a large frequency range, which ensures a higher gain over a large frequency range, thus reflecting lower power. This principle provides for additional conductor strip and a field that is produced, which are structurally superimposed. Further, this arrangement does not need a balancing transformer, which is normally used with dipole antennas for balancing the output.

In addition to the active member 21 and module adapter 4, the motherboard 3 of the central unit 20 has a rectangular recess 3' in the bonding, which corresponds to the broadband no-load mode of the Vivaldi antenna 1 and thus belongs to the non-radiating part of the antenna. The rectangular recess 3' is advantageous because it facilitates the arrangement of the components.

The electromagnetic waves are fed in and out via a feed line 3" made using the microstrip technology, which is located on top of the motherboard 3 and is galvanically coupled with a plated-through hole to the underside, or so-called ground, of the motherboard. The underside is in turn capacitively coupled to the Vivaldi antenna 1. In this manner, the modular components can be arranged to save space.

FIGS. 5 through 8 show, as a block-diagram view, a filter module 16, a booster module 6, a calibration module 12, a passive module 18, and a combiner module 14, which will be discussed below in greater detail.

The filter module 16 (FIGS. 6, 10, 11) is used in combination with the Vivaldi antenna 1 and in combination with the slot dipole antenna 2, as shown in FIGS. 10 and 11. Technologically, such filters may comprise, for example, LC filters, ceramic filters, SAW filters, etc. In this configuration, the device is used as an active receiving antenna. The function of the filter module is to limit the receivable frequency range thereby improving the far-field selection.

The passive module 18 (FIG. 8) is a bridge/jumper whose only function is to connect the antenna to port P2 to use the antenna in the passive mode. For example, it can be used as a transmitting antenna or in combination as a stacked antenna as shown in FIG. 16. Therefore, there is only a microstrip conductor 19 having a desired impedance, preferably of 50Ω on the passive module 18.

When the booster module 6 (FIGS. 5, 12) is used it is provided with a central unit 20 but without an antenna, as shown in FIG. 12. In this configuration, the device is used as an intermediate amplifier in a path (not shown) of coaxial cables to ports P1, P2. The booster module 6 has a number of functions. On the one hand, the input load is limited with an attenuator 7, which can be set up by a DIP switch, such as preferably a rotary DIP switch 8. This is necessary in order not to overload the downstream amplifier (not shown).

For that purpose, the booster module 6 has a level detector 9, a comparator 10, and a light 11. With this arrangement, a test signal can be used to set up the level at which the load measured by the level detector 9 is evaluated by the comparator 10 and is displayed by the light 11, e.g., a LED to indicate to the user that the level corresponds to the correct value. The level adjustment, as described above, is preferably carried out by the attenuator 7 and the rotary DIP switch 8. The calibration procedure will be described in greater detail below.

When used in the calibration mode, (see FIG. 13), when the calibration module 12 is attached or inserted, a test frequency at a constant load can be applied at port P1 to set up the level of a respective transmission path being tested (see FIG. 14) by using its adjustable elements. An oscillator 13, preferably a VCO (Voltage Controlled Oscillator), generates a test signal at a constant load. Because the electrical paths that are used are separated from those of the antenna input, it does not matter whether the antenna unit is plugged in or not (as shown).

The calibration procedure will be explained with reference to FIG. 14 as applied to an exemplary embodiment of a calibration setup, which includes the central unit 20 and the calibration module 12, a booster, and a receiver 23, which are all interconnected by a coaxial cable 22. The booster includes the booster module 6 and the central unit 20.

As described above, the calibration unit 12 generates a test frequency at a constant load, which is used for setting up the level by measuring and evaluating the load applied to the downstream booster 6 and by adjusting it with the attenuator 7. In this manner, an excessive load, which has not been dampened in the cable, is eliminated in the attenuator 7 to rule out amplifier overload and to ensure a constant quality of transmission. The level adjustment is carried out for each cable section and is static, i.e., it must be carried out once only, provided that the cable between the components has not been changed.

FIG. 15 shows an example of a system configuration consisting of the active antenna 2, the booster 6, and the receiver 23 for use in the recording.

The invention makes it possible to use the central unit 20 for different purposes, for which additional devices, which could not be used for other purposes, had to be previously used. This also applies to an application as a stacked antenna (antenna cascade) shown in FIG. 16, with at least two Vivaldi antennas, wherein the central unit 20 is provided with Vivaldi antenna and with the combiner module 14 (FIG. 9), which bundles two incoming signals—one originating from the Vivaldi antenna 1 of the central unit 20 and the other originating from an external Vivaldi antenna 1', which operates in a purely passive mode (technically, both Vivaldi antennas, 1 and 1' may be identical, and they are only differently referenced here) and which has a central unit 20' (technically, both central units 20 and 20' are identical, and they are only differently referenced here) having its respective passive module 18 (FIG. 8). The advantages of the stacked antenna system are known to those skilled in the art of, e.g., bundling of the antenna lobe with the associated reduction of the half-width.

In the transmitting antenna application, the above-described process is reversed, as should be understood by those skilled in the art, with the achievable benefits remaining the same as in the receiving antenna application.

The plug-in modules are significantly smaller compared to the antenna and the central unit, and the depiction here is purely schematic, with the modules being of a standardized size to facilitate their use. The geometric arrangement and the location and construction of the electrical connector and its mating part in the central unit and in the individual modules can be easily determined by those skilled in the art to understand the invention.

Also, in order for those skilled in the art to implement light weight and adaptable available devices and structures according to the invention, it is important that by separating the passive components from the active components and by using standardized interfaces (both geometric and "electric") with the facilitated plugging-in of each selected antenna an unexpectedly large reduction in the number of required components that must be available in each case is achieved, not to mention the rapid adaptation to the required task (calibration, combining, changing the antenna characteristics, etc.).

To summarize, the embodiments described here relates to a receiving system for electromagnetic waves in the microwave range, preferably with optionally at least one Vivaldi antenna 1 and/or an omnidirectional dipole antenna 2 having at least one active component 20 with at least one, which is connectible to at least one receiving/transmitting device, characterized in that the plugged-in antenna 1 or 2 is capacitively coupled to at least one motherboard 3 of the central unit 20, in that the booster module 6, the attenuation module 7, the calibration module 12, the combiner module 14, the filtering module 16, or the passive module 18 can be optionally plugged in the active component 20, and in that the functionality of the central unit 20 is determined depending on the plugged-in module 6, 7, 12, 14, 16, 18.

Of course, the case where some of the universal modules are not used in a receiving system is not described, and such a description would be unwieldy and absolutely confusing. In fact, if a modular system should be provided for transmitting, receiving, combining antennas, boosters, attenuating, calibrating, and possibly, for other purposes, only the antenna connections must be standardized with the central unit and with the module adapters in the central unit.

REFERENCE NUMERALS

01 Vivaldi antenna
01' Recesses
02 Dipole antenna
02' Triangular element
02" Slots
03 Central unit motherboard
03' Rectangle-shaped recess
03" Input/outlet line
04 Module adapter
05 State-of-the-art Vivaldi antenna
06 Booster module
07 Attenuator
08 Rotary DIP switch
09 Level detector
10 Comparator
11 Display element
12 Calibration Module
13 Oscillator
14 Combiner module
15 Splitter/Combiner
16 Filter module
17 Filter
18 Passive module
19 Microstrip conductor
20 Central unit
21 Active element (amplifier)
22 Coaxial cable
23 Receiver

What is claimed is:

1. An antenna system for electromagnetic waves in a microwave range comprising:
    at least one directional antenna or an omnidirectional antenna with at least one central unit having at least one active member which is connectible with at least one reception/transmission system,
    wherein the at least one directional antenna or the omnidirectional antenna is capacitively coupled to at least one motherboard of the at least one central unit;
    wherein one of a booster module, an attenuation module, a calibration module, a combiner module, a filter module, or a passive module is pluggable in the at least one central unit to provide a plugged-in module, and wherein operation of the at least one central unit is determined based on the plugged-in module,
    wherein the omnidirectional antenna is a dipole antenna, and
    wherein the dipole antenna is constructed at least as a triangular conductor member and at least two separate slots.

2. The antenna system of claim 1, wherein the at least one directional antenna is a Vivaldi antenna.

3. The antenna system of claim 2, wherein the Vivaldi antenna is constructed using a printed-circuit board technology in the form of at least two recesses in a bonding.

4. The antenna system of claim 1, wherein the at least one motherboard of the at least one central unit is made with a rectangular recess in a bonding.

5. The antenna system of claim 1, wherein a feed line is galvanically connected by a plated-through hole extending from a top of the at least one motherboard to an underside of a ground of the at least one motherboard.

6. The antenna system of claim 5, wherein the underside of the ground is in turn capacitively connected to a Vivaldi antenna of the at least one directional antenna or to a dipole antenna of the omnidirectional antenna.

7. An antenna system for electromagnetic waves in a microwave range comprising:
    at least one directional antenna or an omnidirectional antenna with at least one central unit having at least one active member which is connectible with at least one reception/transmission system,
    wherein at least one directional antenna or the omnidirectional antenna is coupled to the at least one central unit;
    wherein one of a booster module, an attenuation module, a calibration module, a combiner module, a filter module, or a passive module is pluggable in the at least one central unit to provide a plugged-in module, and wherein operation of the at least one central unit is determined based on the plugged-in module,
    wherein the omnidirectional antenna is a dipole antenna, and
    wherein the dipole antenna is constructed at least as a triangular conductor member and at least two separate slots.

8. The antenna system of claim 7, wherein the at least one directional antenna is a Vivaldi module.

9. The antenna system of claim 8, wherein the Vivaldi antenna is constructed using a printed-circuit board technology in the form of at least two recesses in a bonding.

10. The antenna system of claim 7, wherein at least one motherboard of the at least one central unit is made with a rectangular recess in a bonding.

11. The antenna system of claim 10, wherein a feed line is galvanically connected by a plated-through hole extending from a top of the at least one motherboard to an underside of a ground of the at least one motherboard.

12. The antenna system of claim 11, wherein the underside of the ground is in turn capacitively connected to a Vivaldi antenna of the at least one directional antenna or to a dipole antenna of the omnidirectional antenna.

13. An antenna system for electromagnetic waves in a microwave range comprising:
    a Vivaldi antenna or a dipole antenna with at least one central unit having at least one active member which is connectible with at least one reception/transmission system,
    wherein the Vivaldi antenna or the dipole antenna is coupled to at least one motherboard of the at least one central unit;
    wherein one of a booster module, an attenuation module, a calibration module, a combiner module, a filter module, or a passive module is pluggable in the at least one central unit to provide a plugged-in module, and wherein operation of the at least one central unit is determined based on the plugged-in module; and
    wherein the dipole antenna is constructed at least as a triangular conductor member and at least two separate slots.

14. The antenna system of claim 13, wherein the Vivaldi antenna is constructed using a printed-circuit board technology in the form of at least two recesses in a bonding.

15. The antenna system of claim 13, wherein the at least one motherboard of the at least one central unit is made with a rectangular recess in a bonding.

* * * * *